(12) United States Patent
Dey et al.

(10) Patent No.: US 10,081,366 B1
(45) Date of Patent: Sep. 25, 2018

(54) SENSOR-BASED ASSESSMENT OF ATTENTION INTERRUPTIBILITY

(71) Applicant: Carnegie Mellon University, Pittsburgh, PA (US)

(72) Inventors: Anind K Dey, Pittsburgh, PA (US); SeungJun Kim, Pittsburgh, PA (US); Jaemin Chun, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 257 days.

(21) Appl. No.: 15/146,284

(22) Filed: May 4, 2016

Related U.S. Application Data

(60) Provisional application No. 62/179,328, filed on May 4, 2015.

(51) Int. Cl.
*B60W 40/09* (2012.01)
*B60R 1/00* (2006.01)
*B60W 40/08* (2012.01)

(52) U.S. Cl.
CPC .............. *B60W 40/09* (2013.01); *B60R 1/00* (2013.01); *B60R 2300/105* (2013.01); *B60R 2300/8006* (2013.01); *B60W 2040/0872* (2013.01); *B60W 2510/0604* (2013.01); *B60W 2510/0623* (2013.01); *B60W 2510/0638* (2013.01); *B60W 2520/10* (2013.01); *B60W 2550/20* (2013.01)

(58) Field of Classification Search
CPC ............ B60W 40/09; B60W 2550/20; B60W 2510/0623; B60W 2510/0638; B60W 2520/10; B60W 2040/0872; B60W 2510/0604; B60R 1/00; B60R 2300/8006; B60R 2300/105
See application file for complete search history.

(56) References Cited

U.S. PATENT DOCUMENTS

| 6,904,408 | B1 * | 6/2005 | McCarthy | A61B 5/6815 705/2 |
| 2013/0110617 | A1 * | 5/2013 | Phan | H04W 4/21 705/14.43 |
| 2013/0132203 | A1 * | 5/2013 | Cheng | G06Q 30/02 705/14.58 |

FOREIGN PATENT DOCUMENTS

WO 2015127361 A1 8/2015

* cited by examiner

*Primary Examiner* — Thomas P Ingram

(57) ABSTRACT

The system described herein provides a sensor-based assessment of attention interruptibility. In a driving scenario, this system solves a persistent safety issue with regard to dangerous interruptions as they increase driver workload and reduce performance on the primary driving task. Being able to identify when a driver is interruptible is critical for building systems that can mediate these interruptions. The present invention utilizes sensor data collected from wearable devices and on-board diagnostics which can be used as input to build a machine learning classifier that can determine driver interruptibility in real-time.

27 Claims, 10 Drawing Sheets

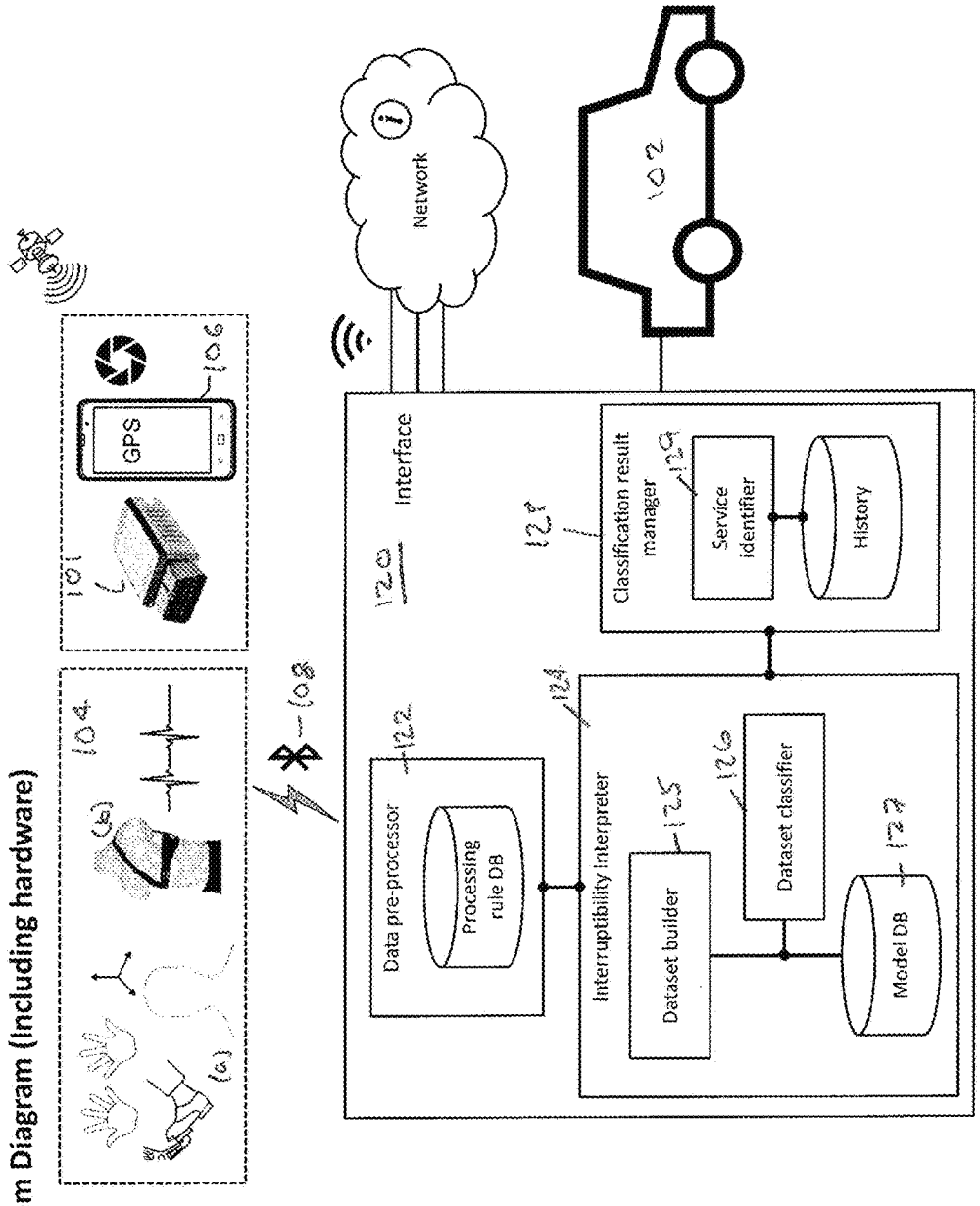

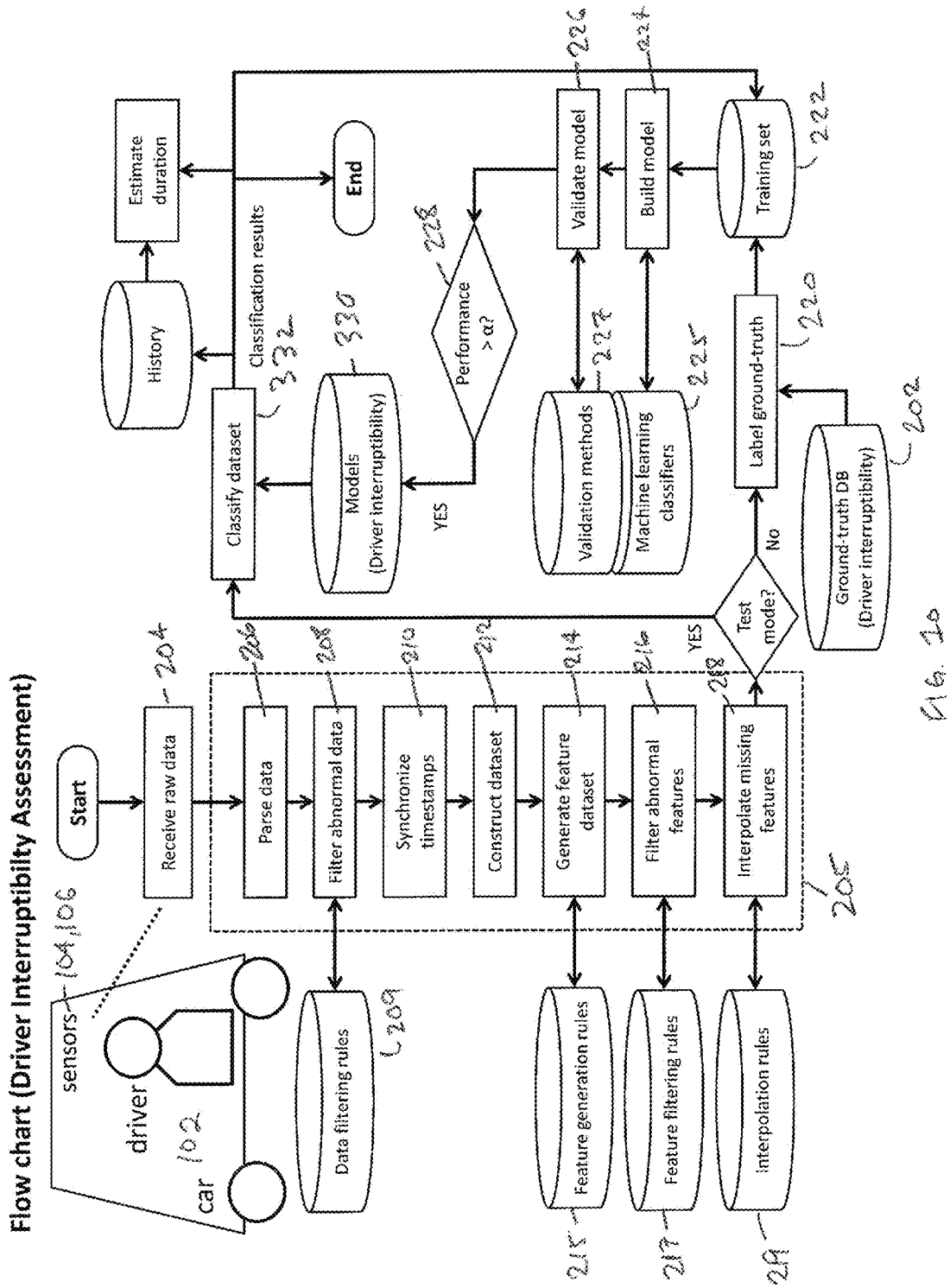

SENSOR-BASED ASSESSMENT OF ATTENTION INTERRUPTIBILITY

RELATED APPLICATIONS

This application claims the benefit of U.S. Provisional Patent Application Ser. No. 62/179,328, filed May 4, 2015.

GOVERNMENT RIGHTS IN THE INVENTION

This invention was made with government support under the NSF Number EEC0540865 and US Department of Transportation DTRT12-G-UTC11. The government has certain rights in this invention.

BACKGROUND OF THE INVENTION

Human attention is a finite resource. When interrupted while performing a task, this resource is split between two interactive tasks. People have to decide whether the benefits from the interruptive interaction will be enough to offset the loss of attention from the original task. They may choose to ignore or delay dealing with the interruption to a more convenient time. Alternatively, they may choose to immediately address the interruption but this comes with a risk of reduced performance on the primary task or a delay in resuming their primary task.

The issue of dealing with peripheral tasks (both self-interruptions and external interruptions) is particularly critical in driving situations. Under normal driving conditions, drivers should have an appropriate following distance (ideally 2-3 seconds behind the car in front) for safe driving. This following distance provides the driver with enough reaction time to decide whether to stop, slow down, or otherwise react to changing driving conditions.

However, driving guidelines like this assume that the driver is fully attending to the driving task. If a driver is performing peripheral tasks, those not directly related to the driving task (e.g., turning off a smartphone alarm or changing the radio station), the driver needs to manage if and when to divide his or her attention. Depending on the frequency and duration of these additional tasks, drivers need to adapt how they apply safe driving guidelines.

Fortunately, drivers naturally adapt to changing driving conditions when dealing with peripheral tasks, e.g., waiting for a red light to attend to these tasks, and not performing them in heavy traffic. They determine appropriate timings for changing the positions of their hands on the steering wheel, controlling the foot pedals, all while monitoring adjacent traffic. However, if a demand for peripheral interaction arrives at an inappropriate or unexpected time (e.g., phone rings while changing lanes to exit the highway), it can lead to dangerous driving situations which may result in a driving violation, accident or even loss of life. In fact, 25% of car accidents in the U.S. are related to phone use.

By identifying situations or patterns when drivers are not able to attend to peripheral tasks due to their current state and driving situation, a workload manager may regulate the flow of information to drivers that could otherwise interfere with driving. Intelligent systems will be able to mediate the delivery of external interruptions, or even disable phone/infotainment systems to mediate self-interruptions, to support safer driving.

Traditionally, user experience has been sampled by asking people to stop mid-task and note their experience. The point is for users to record in situ aspects of experience like mental effort or emotion, based on their own judgment. When users are engaged in naturalistic and uncontrolled real-world tasks, that approach provides low-resolution data since sampling rates need to be low to avoid disrupting the user too much, but are often too low to track dynamically varying user states. This problem is especially disadvantageous in mobile contexts such as driving.

In automotive contexts, when directed to self-report experience, drivers must divert their attention from the driving task. This can diminish cognitive capabilities for the primary task by drawing attention to interruptive demands for peripheral interaction; while driving, interruptions can negatively impact primary task performance. When sampling user state at the end of a driving session, in situ variations of that state can be blurred in relation to the overall user experience. Due to these potential issues, driver experience sampling based on self-reports has typically been explored for evaluating user interfaces (e.g., dashboard designs) or within driving simulations where interruptions are less dangerous.

Interruptions

As the physical world becomes increasingly connected with our information spaces, so too is the likelihood that information will be pushed to people during the performance of real-world tasks. At best, those interruptions may alert users to important warnings or messages, inquire about people's status (e.g., affective states or health conditions for health care), or deliver information that can benefit task performance. Despite this potential value, dealing with these interruptions through peripheral interaction (interaction not directly related to the primary task) demands cognitive attention that can negatively and variably impact user experience. An improved understanding of user availability or interruptibility is necessary for mediating this impact.

Task interruptions result in a time lag before users can resume their primary task, and thus decrease primary task performance. Appropriate timings of interruptions can reduce the impact on users. For example, in the context of desktop computing, interruptions delivered at points of lower mental workload reduced resumption lags and minimized disruption in primary task performance compared to interruptions at points of higher mental workload. In an experiment in which participants were interrupted with emails about consumer products and prices, users who experienced deferrable interruptions during high cognitive workload tasks frequently disregarded the notifications until they reached low workload periods. The results of another experiment showed that when peripheral tasks involving reasoning, reading or arithmetic interrupt the execution of primary tasks, users require more time to complete the primary tasks, commit more errors, and become more annoyed and increasingly anxious than when those same peripheral tasks were presented at the boundary between primary tasks.

These studies offer important insights for designing human-centered interruptions; however, they have mostly explored static, on-screen tasks mediated with conventional computers or mobile devices (e.g., the impact of call notifications for smartphone users). Little research has been conducted to replicate these findings or approaches for delivering interruptions in situations in which users cannot fully divert their attention from the primary task (e.g., driving cars) and in which interruption timings can critically impact the user experience.

Naturalistic Driving

To ensure driver safety, driving studies about dual task paradigms have mostly been conducted in simulated environments. When using sensors to track drivers' eye gazes or physiological responses in these simulations, the experimental design requires special attention to achieve valid and realistic data. Due to the issue of driver safety, existing naturalistic driving datasets mostly include audiovisual records, traffic and lane information from vision-based systems, and researcher-estimated driver states using image processing techniques on videos from multiple cameras installed in cars.

Recent advances in wearable technologies have resulted in sensors that are less intrusive and more comfortable to wear. Nevertheless, little research has been performed that tracks driver body motion or physiological responses during naturalistic driving. Driver work load has been mostly evoked by imposing artificial dual-task demands, for example, auditory stimuli at pre-structured interaction times and intervals. On-board diagnostics (OBD) systems or accelerometers on the steering wheel have been used to assess driver aggressiveness, driving environment and vehicle states.

SUMMARY OF THE INVENTION

One purpose of this invention is to better understand the relationship between a driver's performance of peripheral tasks and in situ driver states and driving contexts. This necessitates the continuous sampling of user states while driving. Therefore, sensors are primarily used to assess driver states. This approach provides quantifiable, fine-grained data in real-time. In the invention described herein, all of the sensing technologies are leveraged to help identify which sensor streams and features are most useful for tracking driver state and the performance of peripheral activities.

Described herein is a novel system and method which presents a near real-time assessment of driver interruptibility based on a range of sensor data streams of peripheral interactions and current driving conditions. This invention demonstrates that sensor data collected from wearable devices and on-board diagnostics can be used to build a machine learning classifier that can determine driver interruptibility every second with a 94% accuracy.

The system described herein can determine driver interruptibility in near real-time by monitoring peripheral interactions such as, but not limited to, vehicle motion, traffic states, physiological responses, and driver motion. The present invention utilizes sensor data collected from wearable devices and on-board diagnostics which can be used as input to build the machine learning classifier.

In one embodiment of the invention, the system is able to detect driver interruptibility by continuously monitoring naturalistic driver/driving states without artificially manipulating cognitive demands. In other example embodiments, both population and individual models are used to determine features that contribute to the high performance of the system. Such a classifier can be used to build systems that mediate when drivers use technology to self-interrupt and when drivers are interrupted by technology.

Note that the invention also has application in areas outside of driving.

BRIEF DESCRIPTION OF THE DRAWINGS

FIG. 9 is an upper-level schematic block diagram, of the components of the invention.

FIG. 10 is a flow chart of the application of the invention to the driving scenario

DETAILED DESCRIPTION OF THE INVENTION

Figure 1:
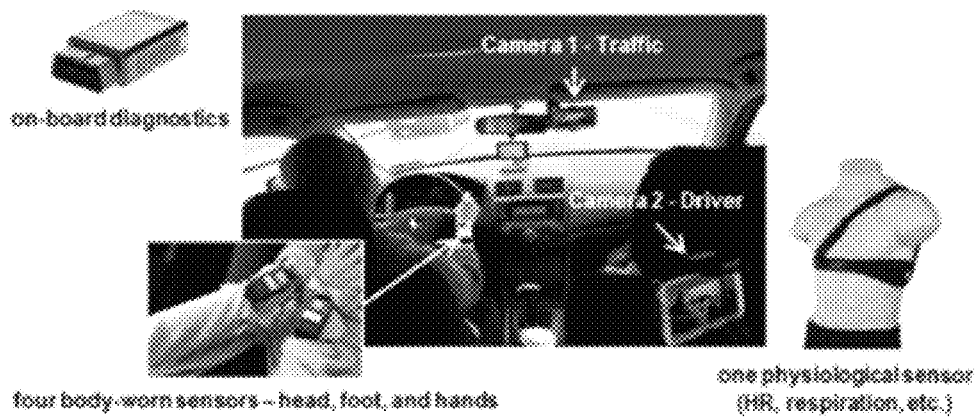
FIG. 1 shows the setup in one possible embodiment of the invention, namely, two smartphone cameras, five body-worn sensors, and one OBD reader.

Described herein is a system and method used for collecting naturalistic driving data for the purpose of identifying situations when peripheral interactions occur.

25 Drivers were recruited (age M=32.0, SD=14.3, age range: 19-69, gender: 14 female and 11 male). Participants were asked to drive their own cars. The experiment took approximately two hours to complete, including about 1.25 hours of driving.

Participants had an average of 14.5 years of driving experience (SD=13.2, range: 1-52 years). They self-reported that they drove on city streets 8.7 times per week (SD=7.1, range: 2-35 times) and on highways 4.5 times per week (SD=4.7, range: 1-20 times). They used familiar routes 8.8 times per week (SD=9.4, range: 2-50 times) and unfamiliar routes 1.2 times per week (SD=1.0, range: 0-3 times). The average driving trip duration was 30.4 minutes (SD=19.2, range: 10-100 minutes).

As shown in FIGS. 1 and 10, an on-board diagnostics (OBD) device 101 was connected to participants' cars 102, and five body-worn sensor devices 104 were used: four accelerometer sensors 104(a) for capturing body motion and one chest belt sensor 104(b) for tracking physiological responses. Two smartphones 106 were installed in each car—one on the front windshield and the other on the head-rest of the passenger. The phone cameras recorded traffic in adjacent lanes and drivers' activities in the cars. They also received information from the OBD device and body-worn sensors via Bluetooth 108 and logged sensor data streams in real-time.

Study participants performed two sessions of naturalistic field driving. Driving routes in both sessions were selected to combine both city streets and highways. The route in the first session consisted mainly of highway driving to a shopping mall. Drivers were allowed to take any preferred or familiar route to get reach the destination, which was 14.7 miles away.

The route in the second session consisted mainly of driving on city streets to a sports stadium in a downtown area, along with shorter lengths of highway driving compared to the previous session. In this session, drivers were asked to drive using a provided Garmin GPS to reach the destination, which was 4.8 miles away.

Some participants performed both driving sessions on the same day while others performed them on different days. By fixing the destinations, and in the second session, the route, drivers were exposed to similar configuration of roads in terms of the number of signal lights and signs encountered, the length of highways and streets, road curvedness, and hill gradient. By leaving flexibility about the route in the first session, data from driving on familiar and unfamiliar routes was able to be collected.

There was a set of activities performed in each session: devices were installed in each driver's car and they were assisted in placing the body-worn physiological sensors. The devices were time-synched and baseline data was collected In addition, the each driver completed a pre-driving questionnaire, performed the driving task, and completed a post-driving questionnaire and interview.

To sync the devices, all of the wearable sensors were shaken for a period of twenty seconds, once after device setup both prior to and after completing the driving tasks. Those time-windows were used for synchronizing time-stamps across data streams from the worn sensors.

For collecting baseline measurements, drivers were asked to grip the steering wheel at the three and nine o'clock positions, while closing their eyes after taking a deep breath. Sensor data streams were collected from the body-worn sensors for 60 seconds of this "at rest" behavior.

In the pre-driving questionnaire filled out prior to the 1$^{st}$ driving session, demographic information of participants and information about driving frequency and patterns when performing peripheral interactions in cars was collected.

In the post-driving questionnaire after both driving session, drivers were asked to describe situations during their just completed session, (e.g., number of passengers, familiarity to driving routes, traffic, sensor comfort, driving performance) and complete a NASA-TLX assessment.

In the post-driving interview, validation was sought for the hypothesis that the driver and driving contexts can help determine when drivers can perform peripheral interactions. Specifically, drivers were presented with several images of drivers performing secondary tasks while driving (e.g., eating, car radio interaction), and then asked to comment on all the activities that they conducted during their driving session, explain what factors led them to perform those peripheral interactions, including traffic, in-car and on-road situations, and then comment on whether the moments when they chose to initiate peripheral interactions while driving would also be good for being interrupted.

Peripheral Interaction Moments Correspond to Driver Interruptibility

In regular driving situations, there are many instances of drivers engaging in peripheral interactions, i.e., actions that take place in the car, but are not related to driving. These instances can be used as ground truth of moments when the drivers believe they are able to enter a situation of divided attention during which they can better deal with interruptions (See 202 in FIG. 10).

For example, if a driver eats or drinks while at a red light and usually interacts with the car radio (e.g., searching for a particular radio station) while driving at a constant speed on a street with no noticeable grade or curve in the road, these situations represent conditions in which the drivers feel they are able to divide their attention. Drivers may consciously or subconsciously know about the moments in which they can perform multiple tasks at the same time. If they are not actually engaged in any peripheral interaction during such a situation, this may imply that this moment can be used to interrupt the driver with external information (e.g., upcoming traffic information, text messages or even advertisements), more safely than in other conditions where no peripheral interactions are ever performed (e.g., during acceleration or driving on a sharp curve). It is also important to separate out interactions with activities that are performed to directly support the driving task, for example, operating blinkers for changing lanes and operating wipers for better visibility when raining. Moments involving these types of tasks cannot necessarily be viewed as opportunities for performing peripheral interactions or interrupting the user.

In the post-driving interviews, all drivers described moments in which they initiated peripheral interactions during the driving session they just completed. They stated that these moments were appropriate for being interrupted.

Based on these interview results validating that moments in which peripheral interactions were performed by the drivers are times when drivers could be interrupted, the captured sensor data was analyzed to automatically identify these moments. This process was initiated with identifying ground truth about what drivers were doing during driving sessions.

Videos and Annotation Features

Camera 1: One of the two smartphone cameras was used for examining drivers' activities in cars. We manually labeled the captured videos for moments when peripheral interactions were performed and not performed. We used five labels. DRIVING_I includes activities that are quite central to the primary driving task (e.g., changing grip positions, operating levers for blinkers or wipers, switches for opening side windows), whereas PI includes activities that are not directly central to the primary task (e.g., eating food, manipulating the air conditioner or car radio, talking on the phone). ONE_HAND_DRIVE_WITH_NO_PI was used to label moments when one of the driver's hands was off the steering wheel but that hand was not performing any specific activity. NO_HAND_DRIVE was used for moments when both hands were off the steering wheel and not performing any peripheral activity. STEERING_ONLY was used for moments when both hands were on the wheel. From our interviews, moments that are labeled with PI or NO_HAND_DRIVE indicate that drivers have higher interruptibility, compared with moments of DRIVING_I or STEERING_ONLY.

Camera 2: The other smartphone camera was used for assessing the traffic around the driver. We labeled the videos for the amount of traffic visible in front of the car, to the left and right of the car, and in the oncoming lanes. The traffic labels we used were NO_TRAFFIC, IGNORABLE, SOME, A_LOT based on the approximate distance of adjacent cars and the number of cars. If the traffic in the oncoming lane was occluded by cars in the left lane or a center guardrail on a highway, we labeled it as OCCLUDED. We also had a label indicating the car's movement, whether it was STOPPED or MOVING.

Three experimenters, each having more than 4-years experience in psychology or human computer interaction, reviewed videos from the smartphones and labeled the kind, start time, and end time of drivers' peripheral activities, and traffic. Note that while we manually labeled the videos from both cameras, these are labels that could be automatically provided using computer vision.

Six Sensors and Applied Features

An OBD device 101 provided information about the status of the vehicle (sampled at 1 Hz) including longitude, latitude, altitude, car speed, engine RPM, throttle position, and fuel flow rate. The data were transmitted via Bluetooth 108 to the smartphone responsible for recording traffic video.

Four YEI 3-Space devices were used, placed on each of the drivers' wrists, on the front of the head, and top of the foot (See 104(a) in FIG. 9). The devices collected information about the drivers' motions using a tri-axial gyroscope, a tri-axial accelerometer, and compass sensors, all at 4-5 Hz. The sensor data was transmitted via Blootooth to the other smartphone. In addition, drivers' physiological data including electrocardiogram, heart rate, respiration rate, body orientation and activity were sampled at 20 Hz sampling rate using sensors 104(b).

After time-syncing the sensors, all sensor data were aggregated, and their means ($\mu$) and standard deviations ($\sigma$) were calculated for every 1-second segment as statistical features (referred to as 'basic' features in this paper).

Figure 2:
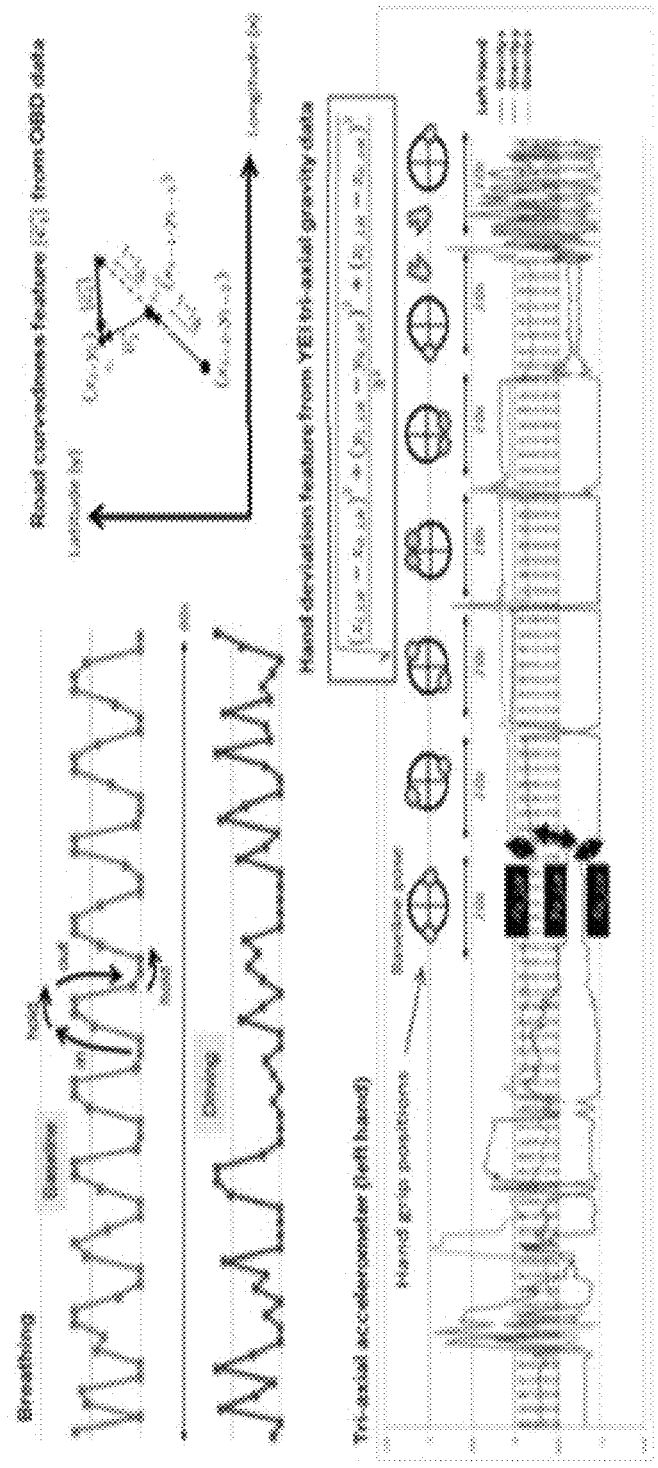
FIG. 2 presents non-limiting examples of applied features from sensor data streams, for example, breathing states (top-left), road curvedness (top-right) and hand deviation (bottom)

In addition, a series of additional features were derived based on the basic features. For example, from the OBD data we derived road curvedness by tracking variations of longitude and latitude coordinates (See FIG. 2—top-right), centrifugal forces by combining car speed and curvedness information, types and gradient of road slope by using the 1st derivative of altitude data. From the YEI data, we derived motion information on how much each monitored body part moved from the baseline position (See FIG. 2—bottom). From the BH data, we quantified levels and duration of breathing-in, breathing-out, and holding-breath states (See FIG. 2—top-left). These supplementary features are referred to herein as 'derived' features.

In total, 100 basic features and 2 derived features (OBD: 72, YEI: 40, BH: 40) and 5 manually annotated features related to traffic from videos (one car driving state and four traffic states around the vehicle—front, right, left, and oncoming) were available.

Data Collection Status

Of the 25 test drivers, 17 drivers successfully completed both driving sessions without any loss in data. The 17 drivers drove for an average of 43 m 59.2 s in the first driving session (SD=7 m 23.5 s, range: 28 m 42 s-54 m 14 s) and 33 m 18.3 s in the second driving session (SD=7 m 42.4 s, 25 m 36-51 m 32 s) on average. For the remaining 8 drivers, most data loss came from Bluetooth disconnections either when OBD devices were accidentally dislodged by drivers' knees or when the Android data logging applications crashed. Occasionally smartphones fell from their mounts or turned enough to capture irrelevant data. When examining the sensor data, we further excluded 2 drivers' data. Their heart rate data contained errors (higher than 200 beats per minute during the entire driving session). This happened when the BioHarness Sensor was worn too loose around the driver's torso during the driving session. We did not include data from these 10 drivers in the sensor data analysis although we did include them in the analysis of the questionnaires and interviews.

Statistical Analysis Method

With the data from our 15 remaining drivers, we examined how driver and driving states differ across our five driving classes:
STEERING_ONLY;
ONE_HAND_DRIVE_WITH_NO_PI,
DRIVING_I,
PI; and
NO_HAND_DRIVE.

For analyzing the continuous measures (e.g., car speed), we conducted a univariate ANOVA by using a general linear model and then used either Tukey HSD or Games-Howell as post-hoc tests after checking the homogeneity of variances (i.e., Levene Statistic), where $\eta p2$ was examined as effect size. For ordinal measures (e.g., human-annotated data or fixed level data), we conducted the Kruskal Wallis Test followed by Mann-Whitney U test as post-hoc, where r was examined as effect size. In the analysis of Likert-scale rating data, Friedman tests and a Wilcoxon Signed Rank post-hoc test were conducted.

Results

Driver Activities: Frequency and Duration

In total, 53 different activities were detected from the 15 drivers. In the remaining analysis, we focus on 22 of these activities that had a total duration of at least 90 seconds summed across multiple instances. As shown in Table 1, activities include interacting with the air conditioner or car radio, operating blinkers or windshield wipers, eating food and drinking, driving with one hand, smoking, dancing, changing hand grip, resting by removing both hands from the steering wheel, and so forth.

One-handed driving most frequently occurred (57.1 times per subject, with 6.9 instances for each 1—minute segment; See Table 1). When total durations were considered, summed up for each participant and summed over a 10-minute segment, it was also first (15.4 and 117.0 seconds, respectively). However, when ranking these by the duration per instance, using one's cellphone was the longest (21.7 seconds), followed by eating food or drinking, smoking, and one-hand driving.

|  | Occurrence | | Duration (sec) | | Duration |
| --- | --- | --- | --- | --- | --- |
| Driver Activities | / subject | / 10-min drive | / subject | / 10-min drive | (sec/occurrence) M(SD) |
| ONE_HAND DRIVE | 57.1 | 6.9 | 15.4 | 117.0 | 17.0 (26) |
| GEAR_SHIFT | 37.1 | 4.5 | 2.7 | 19.0 | 4.2 (6.7) |
| TOUCHING_SELF (e.g. face) | 24.5 | 3.0 | 7.6 | 28.5 | 9.7 (21.5) |
| REST_OFF_WHEEL | 20.6 | 2.5 | 14.7 | 37.2 | 15.0 (14.1) |
| L_BLINKER | 15.7 | 1.9 | 3.9 | 8.6 | 4.6 (16.8) |
| R_BLINKER | 14.0 | 1.7 | 4.4 | 9.4 | 5.6 (22) |
| CAR_RADIO | 9.2 | 1.1 | 5.9 | 9.5 | 8.6 (16.7) |
| R_GRIP_CHANGE | 8.0 | 1.0 | 2.9 | 6.3 | 6.6 (12.5) |
| HEAD_TURNING_WAY_LEFT | 7.3 | 0.9 | 4.2 | 4.8 | 5.5 (12.1) |
| CELLPHONE | 6.7 | 0.8 | 13.5 | 17.6 | 21.7 (26.9) |
| L_GRIP_CHANGE | 6.7 | 0.8 | 1.8 | 2.0 | 2.5 (3.1) |
| HEAD_TURNING_WAY_RIGHT | 5.7 | 0.7 | 2.6 | 1.9 | 2.8 (2.7) |
| GPS_PORTABLE | 4.5 | 0.5 | 14.3 | 6.5 | 12.1 (13.5) |
| AC_CONTROL_SWITCHES | 3.1 | 0.4 | 1.8 | 1.0 | 2.5 (1.5) |
| BOTH_HANDS_OFF_DRIVE | 2.3 | 0.3 | 2.2 | 3.0 | 11.0 (11) |

-continued

|  | Occurrence | | Duration (sec) | | Duration |
| --- | --- | --- | --- | --- | --- |
| Driver Activities | / subject | / 10-min drive | / subject | / 10-min drive | (sec/occurrence) M(SD) |
| FOOD_OR_DRINK | 2.6 | 0.3 | 11.6 | 5.9 | 18.8 (16.6) |
| OTHERS_MISCELLANEOUS | 2.7 | 0.3 | 6.5 | 3.3 | 9.9 (10.7) |
| OTHERS_MUSIC | 2.7 | 0.3 | 1.4 | 5.2 | 16.2 (15.3) |
| SMOKING | 1.9 | 0.2 | 1.2 | 4.3 | 18.3 (41.8) |
| WIPER_WASHER | 1.7 | 0.2 | 2.9 | 1.6 | 7.5 (12.5) |
| AC_AIR_VENTS | 1.1 | 0.1 | 3.5 | 1.5 | 11.7 (19.2) |
| OTHERS_DANCE | 0.1 | 0.0 | 0.2 | 0.2 | 11.0 (8.5) |

Table 1. Frequency and Duration of 22 top-ranked driver activities sorted by a descending order based on occurrence per unit, in which top-five measures and activities are in bold For most of the driving time, drivers used both of their hands (48.0%) or one hand (22.8%) for controlling the vehicle without any peripheral interaction (See STEERING_ONLY and ONE_HAND_DRIVE_WITH_NO_PI in FIG. 3). The time spent in performing a task is indicative of user workload. Similarly, duration of a particular peripheral activity during driving may indicate how drivers are consciously or subconsciously estimating interaction workload for that activity. In other words, the longer the time spent on a peripheral interaction, the greater the availability for being interrupted. Experimentally, it was determined that the average duration was significantly different among the five interaction states ($F_{4,4546}=116.2$, $p=0.000$). The pairwise difference between each state was significant in the post-hoc test with the exception of the durations between ONE_HAND_DRIVE_WITH_NO_PI and NO_HAND_DRIVE (See FIG. 3—two rightmost bars). This implies that although drivers did not actually execute any peripheral activity, one handed driving is still a distinct state from using both hands for steering. Similarly, there was no discernible distinction in durations between one handed and no-handed driving.

Figure 3:
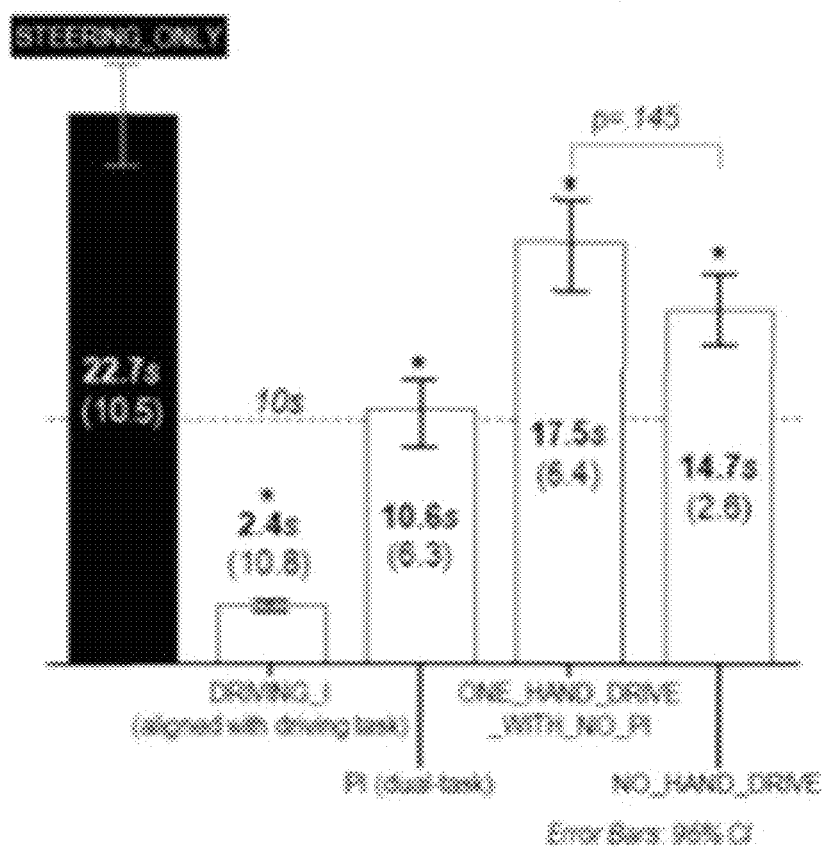
FIG. 3 shows the average time duration of drivers' interaction states compared with states during which the driver is only steering.

Driver activities that corresponded to the driving task (e.g., turning on blinkers) were completed in 2.4 seconds on average, while peripheral interactions lasted seconds (See DRIVING_I and PI in FIG. 3).

Driving States: Car Speed and Road Conditions

Figure 4:
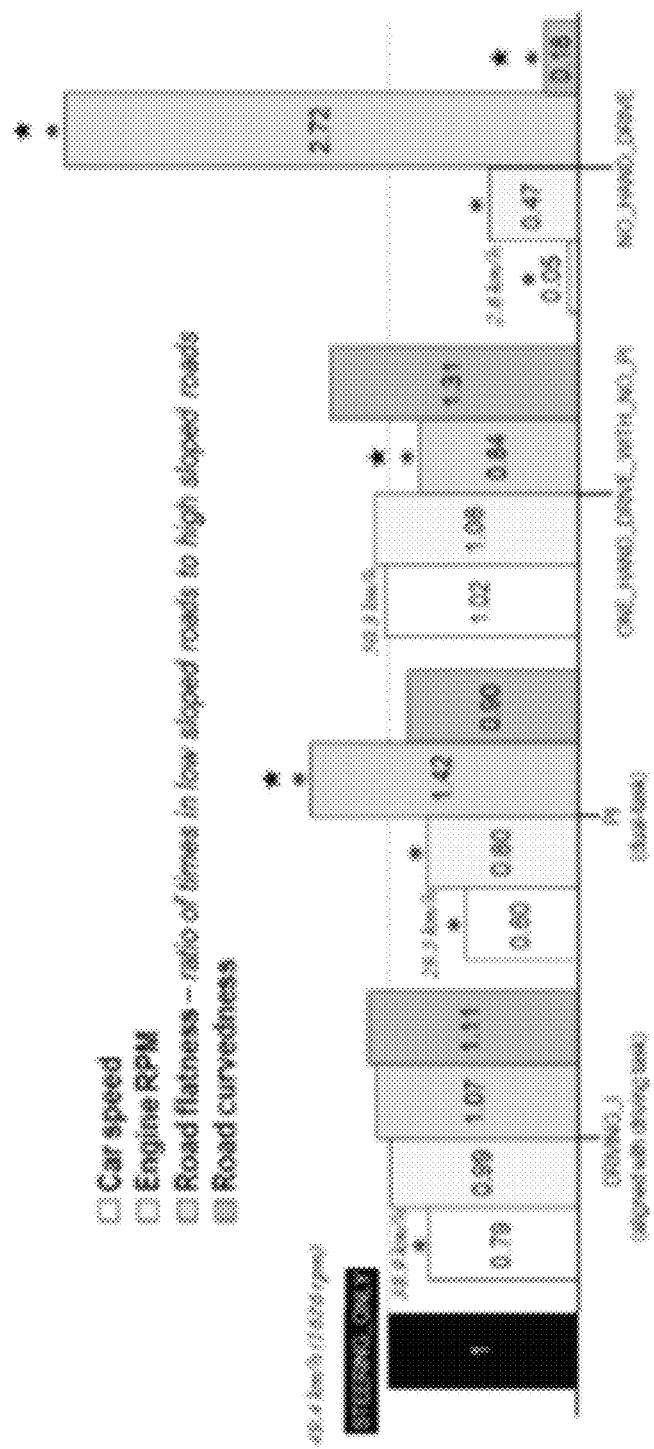
FIG. 4 shows the driving states and road conditions versus states when the driver is only steering.

The OBD data streams revealed that drivers significantly regulated car speed while performing peripheral activities or taking both hands off the steering wheel (See FIG. 4—the left-most bar in each group). Compared to the STEERING_ONLY state, car speed was reduced to 60% while peripheral interactions were performed (See PI state in FIG. 4), and almost reduced completely (slower than 3.0 km/h) while driving without either hand on the steering wheel.

When drivers were in either of these two slower states, engine RPM was significantly lower and the proportion of time spent on flatter roads (i.e., low grades) was significantly higher, compared to the STEERING_ONLY state. In particular, as indicated by the right-most two bars of FIG. 4, drivers were on flatter and less curvy roads while driving with both hands off the steering wheel (statistically significant when compared to each of the other states). Interestingly, one-handed driving was performed at considerably high speeds, without necessarily being on flat or straight roads.

These findings imply that driving status for the PI or NO_HAND_DRIVE states are most similar. In addition, they represent the moments when the driver is likely to be more interruptible. However, we do not include one-handed driving in this group. The driving state and road conditions were different for ONE_HAND_DRIVE_WITH_NO_PI.

Figure 5:
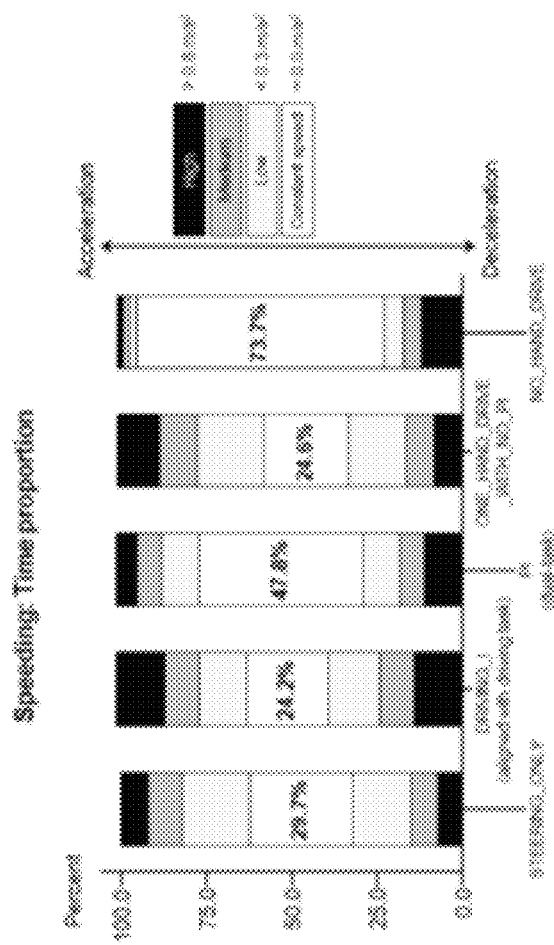
FIG. 5 shows the time proportion of acceleration, deceleration, and constant speed across whole driving.

In addition, when examining how drivers accelerate or decelerate across the five states, we see that drivers tend to drive at more consistent speeds during PI (47.8%) or NO_HAND_DRIVE (73.7%) states than in the ONE_HAND_DRIVE_WITH_NO_PI state (24.6%) (See FIG. 5).

Driver State: Body Motion and Physiological States

Figure 6:
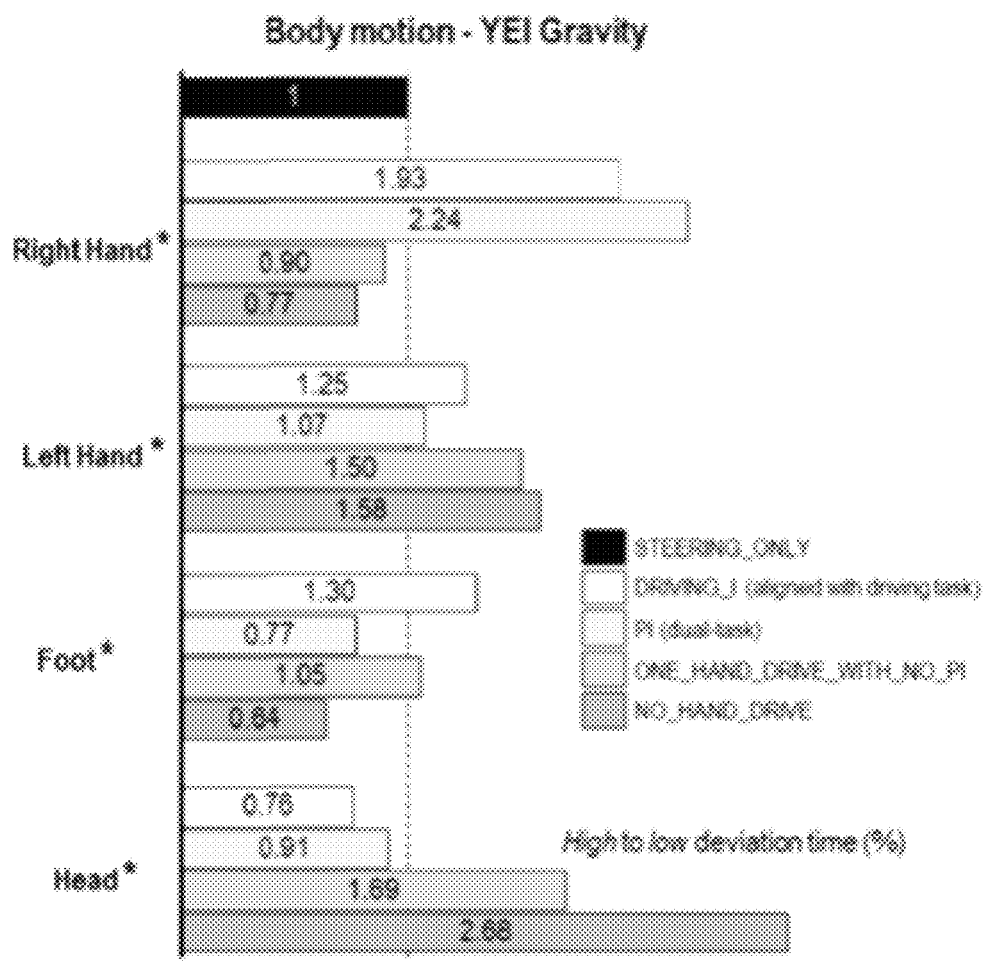
FIG. 6 illustrates driver body motion revealed in sensor data streams in every pair of five defined interaction states.

The deviation of gravity measures from the STEERING_ONLY body pose were significantly different for every pair of the five states across every body element (See FIG. 6). In particular, the right hand movement was distinct when performing driving or peripheral activities (See FIG. 6, 2nd and 3rd bars from the top). Head movement was larger when driving with both hands or one hand off the steering wheel without performing any peripheral activities (See FIG. 6, bottom two bars).

Figure 7:
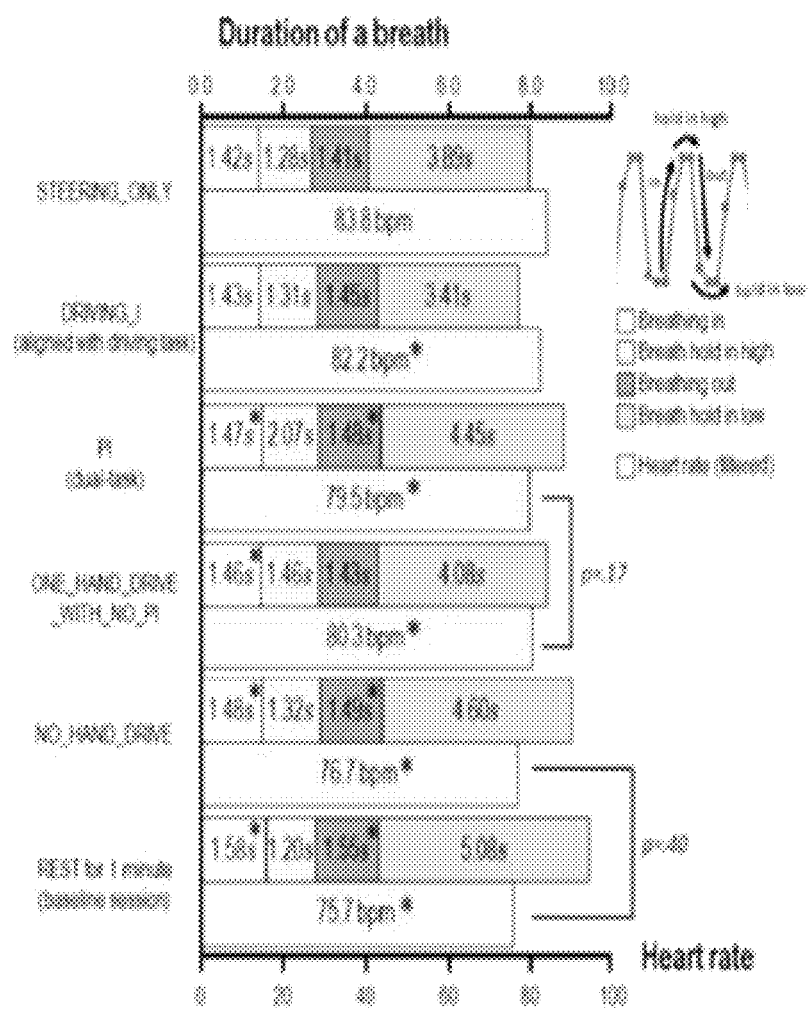
FIG. 7 illustrates drivers' physiological states revealed in sensor data streams versus states in which the driver is only steering.

The breathing states and heart rate of the drivers also significantly varied across the five interaction states ($F_{5, 34693}=6.80$, $p=0.000$ and $F_{5, 6565}=215.0$, $p=0.000$, respectively; FIG. 7). Interestingly, for NO_HAND_DRIVE, the heart rate of the drivers was similarly low as the resting heart rate captured in the baseline session where no driving was performed (See FIG. 7, bottom 2 bars). Also, the heart rate during ONE_HAND_DRIVE_WITH_NO_PI state was similar to PI, but not to NO_HAND_DRIVE or baseline. The duration of drivers holding their breath was not statistically significant ($F_{5,4467}=1.99$, $p=0.075$). Rather, durations for inhaling and exhaling were significantly longer for the PI or NO_HAND_DRIVE states, and similar to when resting in the baseline session.

Overall, driver physiological states for the PI and NO_HAND_DRIVE states are most similar to the resting states. We therefore confirm from our analysis of physiological states, driving states and road conditions, drivers are more interruptible than in the remaining states. However, interruptibility while one-handed driving without any peripheral interactions is still unclear since driver physiological states are similar to the two interruptible states and the baseline, but the driving states and road conditions differed significantly.

Identifying Opportunities for Interruptions

Given the statistical differences across the five interaction states, and particularly between the more interruptible and less interruptible states, it was possible to develop a method to automatically identify opportune moments for driver interruption. Specifically, a classifier that accurately detects or predicts interruptibility every second was built. To build this classifier, the PI and NO_HAND_DRIVE states were combined into a single class representing instances when drivers can be interrupted (INTERRUPTIBLE). Data from the remaining classes was correspondingly combined into the LESS_INTERRUPTIBLE class. Note that it is not called "Uninterruptible" since one cannot know with absolute certainty that drivers are not interruptible during these interaction states, but just that they are likely to be less so.

In one example for this binary classification problem, a random forest classifier was used, which runs efficiently on large databases such as this sensor data. Unbalanced classes were handled using stratified 10-fold cross validation where each fold contains approximately the same percentage of samples from each target class as the complete set, and then applied different sample weights based on the ratio of samples that belong to each class. This procedure for each driver and for each fold was automated.

The population-based classifier had an average classification accuracy of 94.3% classification accuracy across the data from all 15 drivers (SD=0.3%, average precision and recall: 0.94 and 0.89, respectively). From the initial list of 143 features, care speed (OBD, km/h), engine RPM, GPS bearing, centrifugal features, and the movement of the right hand deviating from the baseline position were rank-ordered as the most important features, along with two human-annotations about the car movement states (top-ranked feature) and the front traffic (7th-ranked). While these human annotations could likely be automated with image processing technologies, a second classifier that did not use any human annotations was also built.

The classification accuracy dropped by only 2.2% (92.1%, I=0.2). This means that the binary states representing driver interruptibility can be discriminated accurately every second using sensor data only.

Figure 8:
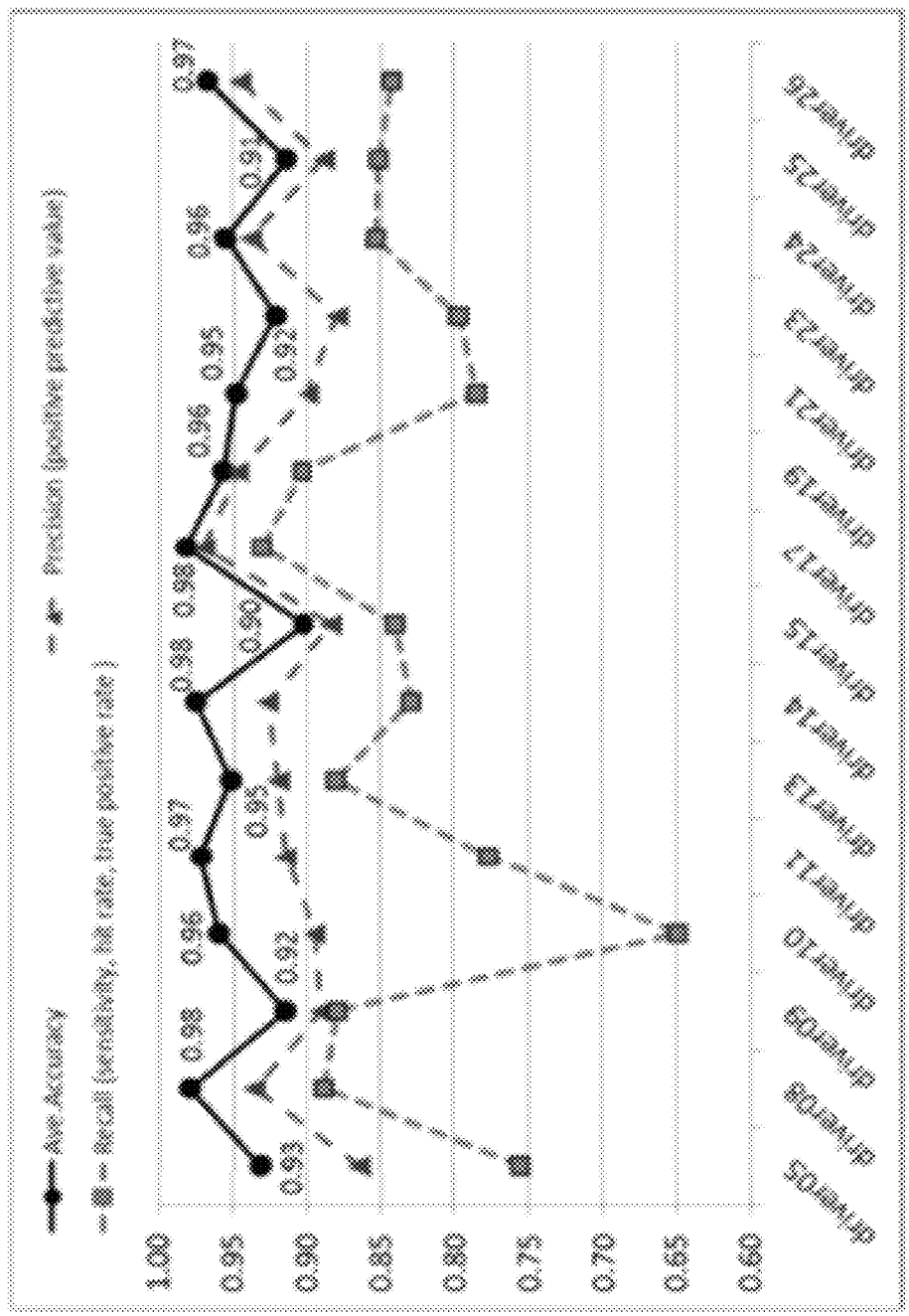
FIG. 8 shows the performance of individual models developed for each of fifteen test drivers.

Next, the performance of the individual models for each of the fifteen test drivers was examined to investigate individual difference in which features were most helpful and whether such models need to be personalized. Promisingly, the average classification accuracy of the individual models of the drivers was 94.9% on average (SD=2.6%, range: 90.2% from 98.2%), almost the same as the population model (94.3%) Accuracy for every driver was greater than 90% (See FIG. 8).

However, the recall rate (i.e., the fraction of relevant instances that are retrieved=the percentage of interruptible moments correctly classified as being interruptible) had some individual differences. Five of the test drivers had recall rates lower than 80%, while the precision rates (i.e., the fraction of retrieved instances that are relevant equals the percentage of moments identified as interruptible that were actually interruptible) were fairly consistent along with the classification accuracy across every driver.

The top fifteen features for each driver that contributed to classification accuracy were focused on, to identify which features were commonly used in the individual models. Of the 143 features, 46 features were chosen in at least one driver's list of top fifteen features (23 from OBD device, 21 from the body-worn sensors, and 2 from the human-annotated data) Similar to the population model, engine RPM, car speed, and car movement annotation features were identified again as important features for more than ten of the drivers. However, unlike in the group model, heart rate, foot and body trunk/torso motion were also important for five drivers, centrifugal force for seven drivers and the front traffic annotation data for only six drivers.

DISCUSSION

Driver and Driving States

The sensor data revealed that drivers perform peripheral activities when experiencing lower workload. Similar to driving without holding the steering wheel, drivers tend to initiate peripheral interactions at a near constant speed on fairly flat and straight roads. Further, drivers' physiological signals were similar to those during the resting states in the baseline session. This implies that drivers may defer processing peripheral tasks until they are experiencing lower mental workload.

An interesting situation is when drivers use only one hand but do not perform any peripheral activity with the idle hand. In general, the physiological responses of the drivers during this state imply lower driver workload, closer to that of performing peripheral interaction. However, the driving states for one-handed driving were much more dynamic than when performing peripheral interactions. Drivers either accelerated or decelerated without avoiding curved roads, and more often even than when using both hands to steer. This provides an interesting hypothesis that drivers may have extra cognitive capacity to deal with peripheral interactions.

Indicative Sensor Data Features

The derived features used to create the classifiers described herein had more discriminative power than the simple statistical (basic) features. For example, the centrifugal feature created with a combination of car speed and road curvedness (more precisely, the square of car velocity divided by the road curvedness feature not considering driver weight) was ranked as the $5^{th}$ most important in the population model and was in the top-15 features for 7 of the drivers' individual models. If the gravity variation coming from the road slope or the driver's seating pose was incorporated, this new feature could be even more powerful.

Similarly, the derived physiological responses (e.g., breathing rates) and road attributes (e.g., categorized slope levels) had statistical differences between driver's interaction states. However, they did not explicitly contribute to building high performance classification models. Only two basic features, heart rate (in top-15 list for five drivers) and electrocardiography amplitude (ranked $12^{th}$ in the group model) highly contributed to the classification accuracy.

To explore how to limit the obtrusiveness of our sensing system, we examined the relative values of the different sensors. For building either the group or individual models for predicting driving interruptibility, the most important features come from the cameras and vehicle movement sensors, except for the right hand motion (which could be detected via camera rather than worn sensor). For individual models, though, data from the physiological sensors was also valuable. It is possible that this body part motion could contribute to the group model as well, particularly if combined across body parts or with the car motion.

Detecting Driving Interruptibility

The system described herein demonstrates that driving interruptibility can be accurately assessed in real-time using sensor data streams, independent of human-annotated information. Further, the results also show that accurate personalized models can be constructed from only 2 driving sessions.

However, individual models for a few drivers provide insufficient performance in correctly detecting driving interruptibility. The performance of the individual models can be improved to be used in practice, even with the promising results herein. Longer-term data collections from individuals or more personalized features (e.g., route familiarity or habitual behaviors in the car) can be used to improve the individual model classification accuracy.

Overall, the models performed quite well in identifying moments when the driver is in the NO_HAND_DRIVE or the PI states. While we equated this to the driver being INTERRUPTIBLE, it could be the case that drivers in one of the other states (particularly one-handed driving) could have additional opportunities for being interrupted.

Operationally, and with reference to FIG. 10, at box 204, raw data is received from the sensors in car 102. This includes the sensors 104(a) tracking the movements of the driver and physiological sensors 104(b), as well as data received from the OBD port of car 102 using reader 101 and a video data feed taken with smart phones 106. At 206 the data is parsed and at 208, statistical outliers are filtered out utilizing data filtering rules 209. These include, for example, readings of extremely high heart rates due to the improper fitting of the biomedical harness with the physiological sensors 104(b) or, for example, when one or more sensors becomes misplaced or dislodged with respect to the driver. At 210, the received data is synchronized in accordance with a universal time stamp and at 212 the dataset is constructed. At 214 the data features are generated in accordance with feature generation rules 215. This would include both basic, statistical features as well as derived features including metrics calculated as a combination of several different data points, including, for example, driver movement data, physiological data, video data and various operating parameters of the vehicle. In 216, abnormal features and statistical outliers are filtered out in accordance with the feature filtering rules 217, and, at 218 missing features are filled in accordance with the interpolation rules 219.

Database 202 contains the ground truth assessment of driver interruptibility. These instances represent times when the drivers believe they are able to divide their attention and perform peripheral actions not related to the primary task, i.e., driving. The ground truths are labeled in 220 and are used as input to a training set 222. At 224, models are constructed in accordance with machine learning classifiers 225. The models may be generalized or individual, however it is contemplated that, given the empirical data collected regarding the performance difference between the generalized models and the individual models, general models would be used in a production scenario. At 226, the model is validated in accordance with various validation methods 227 and, at 228, if the performance of the model is acceptable, the model is used to assess and classify the current dataset collected from the driver at 332 and classification results are output. The classification results are the indication of whether or not the driver is interruptible at any given moment.

The processing system 120 in FIG. 9 consists of a database of data processing rules 122, which are used by processing system 124 to transform the raw collected data into a dataset for classification. Box 124 contains the components that perform the steps contained in box 205 in FIG. 10. Box 128 in FIG. 9 is responsible for generating the interruptibility classifier in accordance with the right side of FIG. 10.

The present invention can be used can be used to design and develop intelligent interruption systems for drivers. The present and future uses and applications of this invention correlate with the attributes of opportune moments detected (e.g., expected duration, expected level of driver engagement). For example, a relevant local advertisement should impose a short intervention during an opportune moment; if a driver has extended interruptibility, interventions such as an alternate route/highway exit to take can be considered. Thus, there are a large number of scenarios in which this system can be applied. The present invention has been described in accordance with several examples, which are intended to be illustrative in all aspects rather than restrictive. Thus, the present invention is capable of many variations in detailed implementation, which may be derived from the description contained herein by a person of ordinary skill in the art. Furthermore, there are applications of the invention outside of the automotive and driving arenas. The invention may be practiced in any scenario that requires split diverting attention from a primary task to support secondary and tertiary tasks. For example, activities such as reading, praying, watching TV, exercising, attending classes, etc. all could benefit from a system which is able to determine, with some level of intelligence, whether or not a person can be, or wishes to be, interrupted.

The described system detects interruptibility in near real-time based on a range of sensor data streams collected from, in the driving scenario, sensors worn by drivers, embedded in vehicles, and present in smart devices. The system determines whether they were interruptible or not (i.e., binary) every second with 94% accuracy. Its key technology also allows the system to estimate expected duration of driver's interruptible moments.

This system is the first that addresses the issue of when to intervene—i.e., optimal timing to provide interruptive services to users in dynamic situations. Existing interruption technologies mostly address the issues related to static, on-screen tasks mediated with conventional computers or mobile devices (e.g., the impacts of call notification for smart phone users); therefore, it is not easy to replicate their performance in situations in which users cannot fully divert their attention from the primary task (e.g., driving cars) and in which interruption timings can critically impact their safety and experience.

The system allows users inexpensive, lightweight, and portable instrumentation in any setting. Further, it can be modularized to be compatible with commercial off-the-shelf wearable devices (e.g., smartphones, smart wristband or watches) that users may already own, and with existing WiFi-based Internet of Things sensors (e.g., motion detection).

The key technology is applicable to in-car information systems to determine timings to proactively adjust:
  information types (e.g., switching to inform about nearest gas station vs. gas station selling cheapest gas based on fuel gauge level vs. distance to the next gas station location),
  presentation methods (e.g., switching to detailed visual information with minimal auditory cues vs. symbolic visual cues with descriptive auditory information— with same information content), and/or
  user interaction schemes (e.g., switching to verbally answering vs. tapping a button on touch-based screen to confirm or select items) according to the real-time driver/driving situations.

In addition, the invention can be applied to enable the estimating of the expected duration of the interruptible moments, thereby allowing the systems to regulate the flow of information to the user and the sensory mode of feedback to limit interference with the primary activity—e.g., in the driving scenario, coordinating the level of details of traffic, route guidance, local restaurants, new emails, breaking news to driver, adjusting volume of certain auditory information according to street noise.

We claim:

1. A system for determining the interruptibility of the driver of a vehicle, comprising:
  an interface to said vehicle for collecting information about the operation and state of said vehicle;

one or more sensors for detecting motion of said driver;
one or more sensors for collecting physiological information about said driver;
one or more sensors for detecting activities of said driver;
one or more sensors for detecting conditions outside of said vehicle; and
a processor, in communication said vehicle interface and all of said sensors, said processor running software for performing the functions of:
collecting data from all of said sensors and calculating statistical features from said data;
calculating derived features from said statistical features; and
applying a time-dependent interruptibility classifier as a function of said statistical features, derived features, the state of the driver and road conditions to determination the interruptibility.

2. The system of claim 1 wherein said statistical features are formed by periodically calculating means and standard deviations of said collected data.

3. The system of claim 1 wherein said derived features are calculated as a function of multiple statistical features.

4. The system of claim 1 wherein said state of said driver is selected from a group consisting of steering only, driving with interaction, one-handed driving with no peripheral interaction, no-hand driving and peripheral interaction.

5. The system of claim 1 wherein said interface to said vehicle is connected to the OBD port of said vehicle.

6. The system of claim 5 wherein said information collected from said OBD port consists of one or more of longitude, latitude, altitude, car speed, engine RPM, throttle position, and fuel flow rate.

7. The system of claim 1 wherein said sensors for detecting driver activity is a camera mounted to view the inside of said vehicle, said camera detecting driver actions both necessary for and peripheral to the task of driving.

8. The system of claim 1 wherein said sensors for detecting conditions outside of said vehicle is a camera mounted to view outside of said vehicle, said camera detecting one or more of traffic density in front of said vehicle, traffic density to the left of said vehicle, traffic density to the right of said vehicle and traffic oncoming with respect to said vehicle.

9. The system of claim 1 wherein said sensors for detecting motion of the driver are accelerometers or gyroscopes.

10. The system of claim 9 wherein said sensors for detecting motion of said driver are connected to one or more of the left wrist of said driver, the right wrist of said driver, the top of the foot or feet of said driver and the front of the head of said driver.

11. The system of claim 1 wherein said sensors for collecting physiological information about said driver collected one or more of an electrocardiogram, heart rate, respiration rate, body orientation and activity level.

12. The system of claim 1 wherein said interruptibility classifier indicates times when said drivers are most interruptible and times when said drivers are less interruptible.

13. The system of claim 1 further comprising a predictive model for predicting driver interruptibility.

14. The system of claim 13 wherein said predictive model is personalized for said driver and further wherein said derived features, the state of the driver and road conditions are compared to said predictive model to determine said interruptibility classifier.

15. The system of claim 13 wherein predictive model is a generalize for an average driver and further wherein said derived features, the state of the driver and road conditions are compared to said predictive model to determine said interruptibility classifier.

16. The system of claim 1 wherein said interruptibility classifier is used by systems in said vehicle to determine is said driver may be interrupted.

17. A method for determining the interruptibility of the driver of a vehicle, comprising:
collecting data regarding current operational parameters of said vehicle from an interface connected to the OBD port of said vehicle;
collecting data from one or more sensors for detecting the motion of said driver;
collecting data from one or more sensors providing physiological information about said driver;
collecting images from one or more cameras for detecting activities of said driver;
collecting images from one or more cameras for detecting road conditions outside of said vehicle;
calculating a set of statistical features from said data collected from said vehicle and said driver;
calculating derived features of the operation of said vehicle from said statistical features; and
applying a time-dependent interruptibility classifier as a function of said statistical features, said derived features, the state of the driver and the current road and traffic conditions to determine the interruptibility.

18. The method of claim 17 wherein said interruptibility classifier is calculated by comparing said derived features, the state of the driver and the current road and traffic conditions to a personal predictive model for said driver which has been trained by said driver.

19. The method of claim 17 wherein said interruptibility classifier is calculated by comparing said derived features, the state of the driver and the current road and traffic conditions to a generalized predictive model of an average driver.

20. The method of claim 17 wherein said interruptibility classifier indicates times when said driver is most interruptible and times when said driver is less interruptible.

21. A method for determining attention interruptibility of a user, comprising:
(a) collecting data regarding the current environment of said user;
(b) collecting data from one or more sensors for detecting the state and movement of said user;
(c) calculating a set of statistical features from said data collected from said environment and from said user;
(d) calculating derived features as a function of combinations of collected data from said user and from said environment;
(e) forming a current dataset based on said statistical features, said derived features, the state of said user and the current environment of said user; and
(f) applying a time-dependent interruptibility classifier as a function of said current dataset to determine the interruptibility.

22. The method of claim 21 wherein said step (a) includes collecting physiological information about said user.

23. The method of claim 22 wherein said step (a) includes using image sensors to collect visual images for detecting activities of said user.

24. The method of claim 21 wherein said step (b) includes using image sensors to collect visual images for detecting environmental conditions and settings.

25. The method of claim 21 wherein said interruptibility classifier compares said current dataset to a personal predictive model for said driver which has been trained by said driver.

26. The method of claim 21 wherein said interruptibility classifier compares said current dataset to a generalized predictive model of an average driver.

27. The method of claim 21 wherein said interruptibility classifier indicates times when said user is most interruptible and times when said user is less interruptible.

* * * * *